March 20, 1956 H. C. RHODES 2,738,741
PRESSURE BOARD FOR DOUGH MOLDING APPARATUS
Filed Oct. 24, 1949 2 Sheets-Sheet 1

INVENTOR.
HERBERT C. RHODES
BY
Otto Moeller
Attorney

March 20, 1956  H. C. RHODES  2,738,741
PRESSURE BOARD FOR DOUGH MOLDING APPARATUS
Filed Oct. 24, 1949  2 Sheets-Sheet 2

INVENTOR.
HERBERT C. RHODES
BY
Otto Moeller
Attorney

United States Patent Office 2,738,741
Patented Mar. 20, 1956

2,738,741

PRESSURE BOARD FOR DOUGH MOLDING APPARATUS

Herbert Cecil Rhodes, Portland, Oreg., assignor to Read Standard Corporation, a corporation of Delaware Application October 24, 1949, Serial No. 123,124

9 Claims. (Cl. 107—9)

My invention relates to an improved method and apparatus for kneading dough that has been sheeted and then coiled into a cylindrical roll; and this application is a continuation in part of my copending application, Serial No. 91,165, filed under date of April 25, 1949, now Patent No. 2,631,550, granted March 17, 1953, and entitled "Power Curler."

Known types of dough molding machines include sheeting rolls for forming lumps of dough into sheets, coiling means for coiling the sheets into cylindrical rolls, and a cooperating pressure board and conveying belt for kneading and elongating the coiled dough piece.

The present invention is particularly concerned with an improved method for carrying out the last named step of kneading and elongating the coiled dough piece and novel apparatus particularly adapted for practicing the method.

The invention has for its primary object the provision of an improved method of kneading and working a coil of dough, and the provision of an improved pressure board for carrying out said method to produce, by such improved method and apparatus, a loaf of bread of highest quality and finest texture.

The invention contemplates a method and apparatus for effectively removing gas or air pockets from between the convolutions of the coiled dough piece, avoiding tearing or rupturing of the skin of the coil, and elongating the coil to proper pan length. In carrying out the steps of the method, the coil is carried along on a conveyor beneath a pressure board designed, to effect a squeezing action on the coil progressively from its center outward towards the ends by a V-shaped ridge; to relieve the pressure on the coil of dough between the V-shaped ridge to permit the dough to relax; to apply a secondary gentle and progressively increasing pressure on the relaxed coil of dough from its center outward towards the ends thereof and finally exerting a gentle pressure on the coil throughout its length.

Another object of the invention is to provide in the loaf of dough a more uniform distribution of gas cells and elimination of excessively large gas cells by imparting to the coil of dough a twisting action about its longitudinal axis extending outwardly from the middle of the coil towards its ends whereby the gas cells are elongated longitudinally of the coil.

Other objects and advantages of the invention will appear from the following description when read in conjunction with the accompanying drawings, in which Figure 1 is a fragmentary plan view of a moulder showing the pressure board applied thereto;

Figure 1:
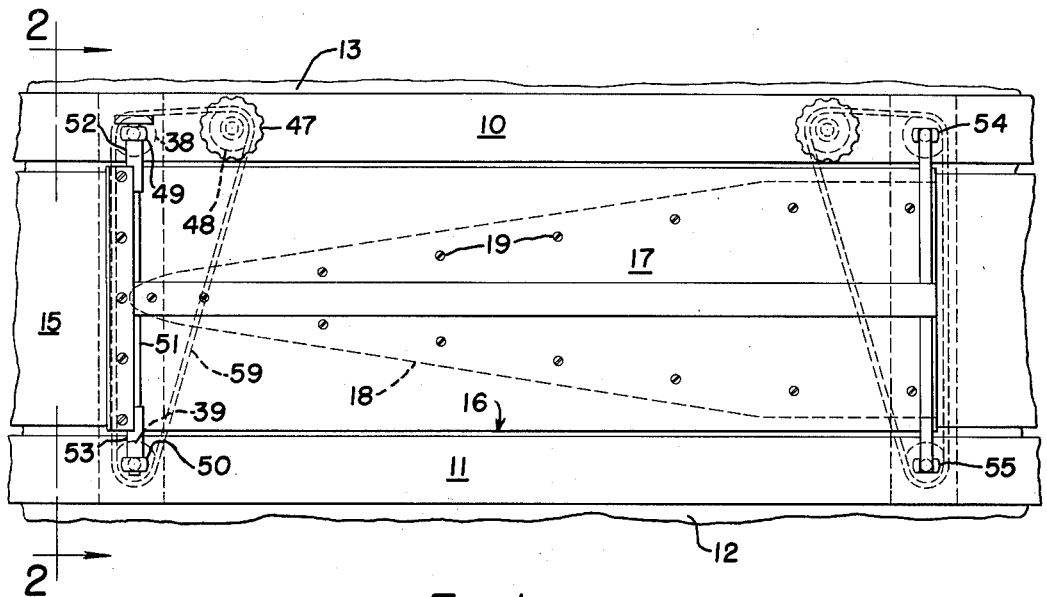
Figure 2:
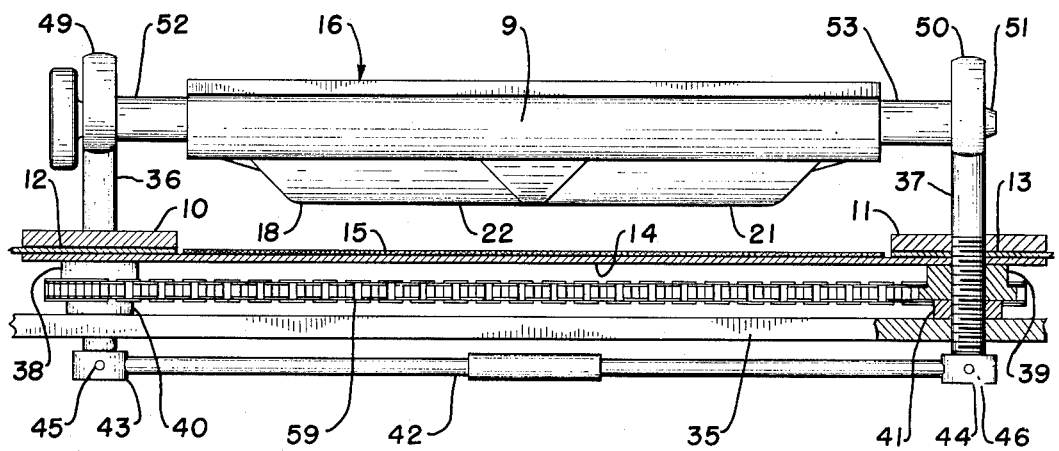
Figure 2 is a sectional view taken on the line 2—2 of Figure 1, with parts of the apparatus shown in end elevation and partly broken away.

Referring particularly to Figures 1 and 2, there is shown a pair of horizontal longitudinally extending spaced plate members 10 and 11 secured in any suitable manner on a moulder supporting frame, inturned portions of which are shown in Figure 2 at 12 and 13.

Between the plate members 10 and 11 is a rigid horizontal table 14 suitably secured to the under sides of the inturned frame members 12 and 13 and arranged to support the upper run of an endless conveyor belt 15. The belt 15 passes around rollers through which it is driven and since the operating means for the belt is conventional in the art, it is not shown in the drawings. The dough pieces that have previously been sheeted and coiled into cylindrical form in a manner well known in the moulder art are supported on and conveyed by the upper run of the belt 15 beneath the pressure board 16, with the axis of the coil of dough perpendicular to the direction of travel of the belt. The belt 15 is selected to have a greater width than the length of the finished dough loaf as it emerges from beneath the pressure board 16.

The pressure board 16 is mounted above and in spaced relation with respect to the conveyor belt 15 and is arranged for vertical adjustment to increase or decrease the distance between the pressure board 16 and conveyor belt 15 for accommodating coiled dough loaves of different sizes. The adjustable supporting arrangement for the pressure board 16 will be hereinafter described in detail.

Referring now to the pressure board itself, it includes a rectangular shaped base member 17 of a uniform width greater than the length of the finished dough loaf emerging from the pressure board. The forward end portion of the base member 17, namely that portion first receiving the coil of dough conveyed by the belt 15, is curved upwardly as shown at 9 in Figure 4, to facilitate entrance of the coil of dough beneath the pressure board and to preclude rupturing the skin of the dough loaf.

The bottom side of the pressure board base member 17 is provided with a kneading and elongating member 18 hereinafter referred to as the pressure board insert. The pressure board insert 18 is preferably formed as a separate member attached to the base member 17 in any suitable manner, as by screws 19 shown in Figures 1 and 2. The portion of the bottom surface of base member 17 left exposed by the insert 18 is preferably covered by a sheet of canvas 20 or other suitable material. For convenience in applying and securing the sheet of canvas 20 to the base member 17, it is arranged to extend between the pressure board insert 18 and the base member 17.

It is to be understood, of course, where the dough is of such nature or the material of the base member 17 is such that the adhesive factor between the dough and the base member is negligible or where such adhesion as exists is not objectionable, then the canvas sheet 20 may be eliminated, and if desired the insert 18 and the base member 17 may be made as an integral unit. Also, if desired, the canvas sheet may cover the working surface of the base member 17 and insert 18, but it should, in order to obtain the best results from the insert 18, be pliable enough to permit it to follow the contours of the working surface of the insert so that working surface will have a functional effect on the coil of dough.

The pressure board insert 18 is disposed longitudinally of the base member 17 and is defined for the greater portion of its length by ribs 21 and 22 arranged in the form of a V, the apex of which is located midway between the sides of the base member adjacent the entrant end of the pressure board 16 slightly rearward of the upwardly curving portion 9 of the base member 17. The rearward ends of the ribs 21 and 22 terminate in close proximity to the adjacent marginal side edges of the base member 17 and taper, as at 23 and 24, into the working surface of the rearward portion 25 of the insert 18. In its rearward extent the insert 18 terminates approximately flush with the rearward end of the base member 17.

Figure 4:
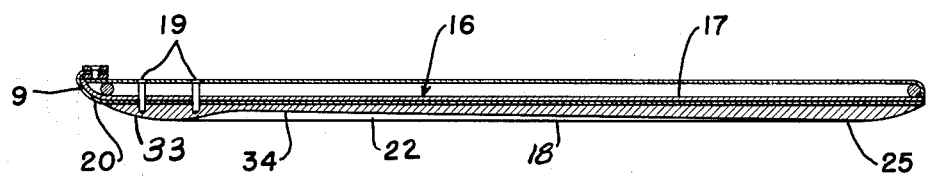
Figure 4 is a sectional view of the pressure board taken on the line 4—4 of Figure 3.
Figure 5:
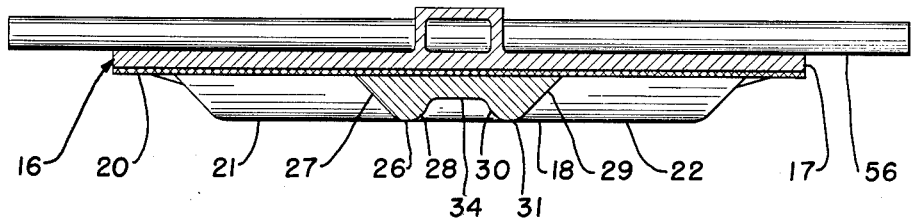
Figure 5 is a sectional view of the pressure board taken on the line 5—5 of Figure 3.

The ribs 21 and 22 are similar in cross section and therefore in describing the rib 21 it will be understood that it applies also to rib 22. Referring particularly to Figure 5, the crest 26 of rib 21 is arcuate and the outer side 27 and inner side 28 slope divergently from the crest 26. The outer side 27 of rib 21 and the similar outer side 29 of rib 22 slope to the plane of the base member 17 and have a more gradual slope than the inner side 28 of rib 21 and the similar inner side 30 of rib 22. The crest 26 of rib 21 and the similar crest 31 of rib 22 lie in a plane parallel to the plane of the working surface of the base member 17. With the shape of the ribs 21 and 22 as described, it is apparent that the nose 32 of the insert 18, formed by the junction of ribs 21 and 22, slopes gently from the junction of the crests 26 and 31 forwardly to the tip of the nose 32, as best shown at 33 in Figure 4, and laterally to the sides thereof into the plane of the base member 17.

With the construction as set forth above, it is evident that as a coil of dough is conveyed forwardly on the belt 15 beneath the entrant end of the pressure board 16, the nose 32 of the insert exerts a gradually increasing squeezing action on the coil intermediate its ends as it approaches the junction of the crests of the ribs 21 and 22, whereby rupturing or breaking of the skin of the dough is precluded. As the coil of dough continues to advance beneath the pressure board 16, the diverging ribs 21 and 22 exert a continuous kneading or squeezing action on the dough coil progressively outward from the center of the coil to the ends thereof.

Figure 3:
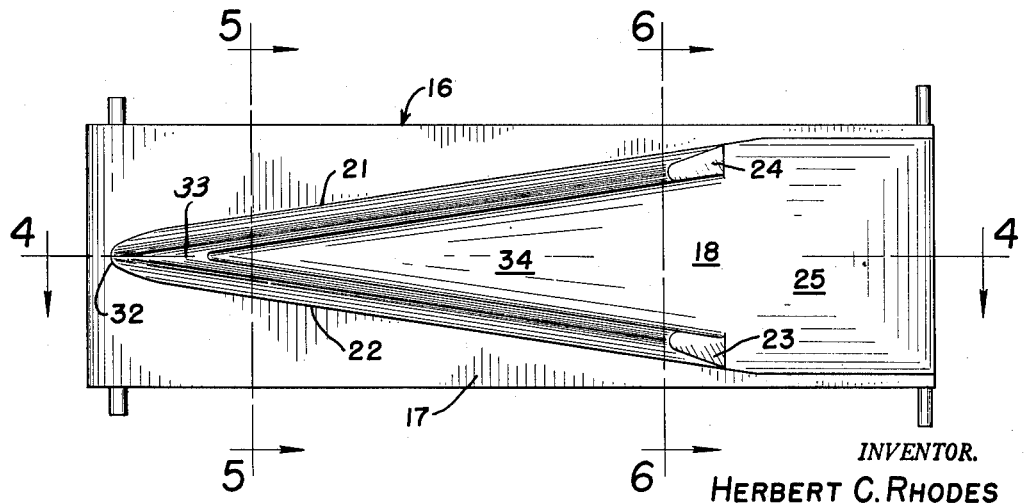
Figure 3 is a bottom view of the pressure board.
Figure 6:
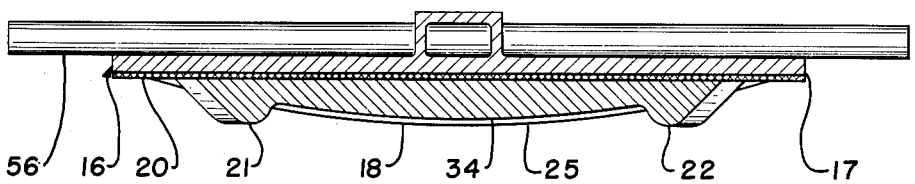
Figure 6 is a sectional view of the pressure board taken on the line 6—6 of Figure 3.
Figure 7:
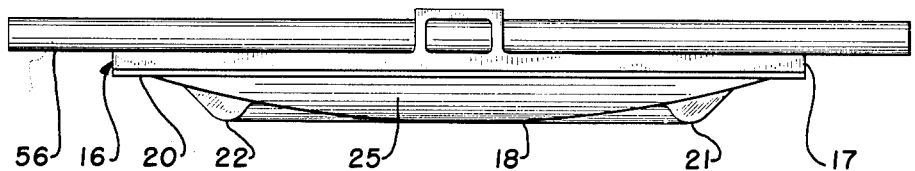
Figure 7 is an end view of the pressure board as viewed from the right of Figure 3.

The V-shaped surface 34 of the insert 18 included between the ribs 21 and 22 is recessed below the plane of the crests of the ribs 21 and 22 and in transverse cross section slopes gradually from the base of the inner sides 28 and 30 of the ribs 21 and 22 to a maximum height on the longitudinal center line of the insert 18. Preferably this sloping contour is in the form of a convex arc as best shown in Figure 6. Considered longitudinally the surface 34 of the insert 18 included between the ribs 21 and 22 slopes rearwardly to merge with the surface 25 rearward of the ribs 21 and 22 as best shown in Figures 3 and 4. The working surface 25 also slopes from its marginal sides toward the longitudinal center line thereof and along the longitudinal center line this surface is approximately in the same horizontal plane as the crests 26 and 31 of the ribs 21 and 22 as clearly shown in Figure 7.

Now, as the coil of dough is conveyed forwardly beneath the pressure board, the ribs 21 and 22 will engage the coil and squeeze it first midway between its ends and then progressively and continuously out toward the ends thereof, thereby elongating the loaf and squeezing the gases and air laterally outward from between the convolutions of the coil. As the coil advances, the recessed surface 34 of the pressure board insert 18 permits the portion of the coil between the ribs 21 and 22 to relax, whereupon the sloping conformation of the surface 34 exerts a secondary pressure on the coil, starting at midway between its ends. The longitudinal slope of the surface 34 effects a gradually increasing pressure on the dough as the coil advances and the transversely convex contour of the surface 34 exerts a gradual and progressive pressure on the coil outward from the center thereof towards its ends. The secondary pressure applied to the coil provides further elongation and removal of gases remaining between the convolutions of the coil.

My invention thus provides for effective removal of the gases between the convolutions of the coil and elongation thereof without punishing the dough or rupturing and breaking the skin of the dough. Another important feature of the invention is the twisting that is imparted to the coil for elongating the gas cells in the dough whereby the larger gas cells are broken down and a uniform distribution of gas cells throughout the loaf is obtained.

The twisting action is accomplished in the following manner. When the dough coil engages the nose 32 of the insert 18, the center portion of the coil is retarded while both end portions continue to advance and at the same time are being turned about the axis of the coil by the action of the conveyor belt 15. When the coil has advanced to the recessed front portion of the surface 34 the pressure on the center portion of the coil is relieved and it catches up with the outer ends. As the coil moves farther along, pressure is again applied to the center of the coil by the gradually sloping configuration of the surface 34 so that a secondary twisting action is imparted to the coil.

The pressure board 16 is arranged for adjustment to vary its spacing from the belt 15. Means are provided at the forward and rearward ends of the pressure board 16 so that either or both ends may be raised or lowered.

Referring to Figures 1 and 2, the adjusting assembly for the forward end of the pressure board 16 is supported on a transversely extending plate 35 spaced below the belt supporting table 14, and secured at its ends in any suitable manner to the side frame (not shown) of the moulder.

The adjusting assembly includes the riser posts 36 and 37, disposed one at each side of and adjacent the forward end of the pressure board 16. The posts 36 and 37 extend freely through the longitudinal plates 10 and 11, respectively; the inturned frame members 12 and 13; respectively; and the transverse plate member 35, to permit raising and lowering of the posts. The lower portions of the posts 36 and 37 are threaded and arranged to be threaded thereon are sprockets 38 and 39, respectively. The sprockets 38 and 39 are disposed between the belt table 14 and the transverse plate 35 and are supported on the latter in spaced relation by spacer collars 40 and 41, respectively.

Joining the lower ends of the posts 36 and 37 that project through the transverse support plate 35 is a rod 42 provided at its ends with stop members 43 and 44 to preclude raising of the posts 36 and 37 beyond their operative position. Set screws 45 and 46 threaded through the stop members 43 and 44 into the lower ends of posts 36 and 37 prevent rotation of the latter as they are raised and lowered by turning of the sprockets 38 and 39.

A handwheel 47 provided with a shaft journaled in a bearing supported on the longitudinal plate 10 carries a sprocket 48 at its lower end, and a sprocket chain 59 is trained around the sprockets 38, 39 and 47. Thus by turning the handwheel 47, the posts 36 and 37 may be raised or lowered to any one of a number of positions. The upper ends of the posts 36 and 37 are provided with slotted heads 49 and 50 arranged to receive the shaft 51 which extends through the bearings 52 and 53 formed with the pressure board 16 whereby the pressure board is adjustably supported by the posts 36 and 37.

A similar adjustable supporting assembly is provided for the rearward end of the pressure board 16 and therefore need not be described. Preferably the posts of the rearward assembly are provided with open slotted heads 54 and 55 to receive the ends of a shaft 56 formed with the pressure board 16 so that the pressure board may be pivotally raised about its rearward end without disassembling any part of the adjusting assembly.

I claim:
1. A pressure board for kneading a coiled dough loaf comprising a base member having an end adapted to receive a coiled dough loaf and having a working surface along which the coiled dough loaf is adapted to travel, and a kneader on the said working surface of said base member, said kneader having a pair of diverging ribs arranged in the form of a V centrally disposed between the sides of said base member with the apex adjacent the receiving end of said pressure board base member and having a surface between said ribs depressed with respect to the plane of the crests of said ribs, the depth of said depressed surface with respect to the plane of the crests of said ribs being greater adjacent said ribs than at the median vertical plane bisecting the angle formed by said ribs, and said depressed surface sloping from adjacent said ribs to a crest lying in said median vertical plane.

2. A construction according to claim 1 in which the surface between the diverging ribs is arcuate in transverse cross section.

3. A construction according to claim 1 in which the surface of the crest between the diverging ribs slopes gradually upward in a longitudinal direction toward the open end of the V formed by the said ribs.

4. A construction according to claim 1 in which the plane of the crests of the ribs is parallel with the plane of the surface of the base member of said pressure board.

5. A construction according to claim 1 in which the ribs have a rounded crest and sloping side walls.

6. A construction according to claim 1 in which the surface between said ribs is convex in transverse cross section and gradually increases in width and height from the apex to the open end of the V formed by the said ribs.

7. A pressure board for kneading a coiled dough loaf comprising a flat base member having an end adapted to receive a coiled dough loaf and having a working surface along which the coiled dough loaf is adapted to travel, and a kneader on the said working surface of said base member, said kneader having a pair of diverging ribs arranged in the form of a V centrally disposed between the sides of said base member with the apex adjacent the receiving end of said pressure board and having a surface between said ribs depressed with respect to the plane of the crests of said ribs, said depressed surface being convex in transverse cross section with said convex surface facing outwardly from said base member, and said ribs having their outer sides sloping to the plane of the working surface of said base member.

8. A pressure board for kneading a coiled dough loaf comprising a flat base member having an end adapted to receive a coiled dough loaf and having a working surface along which the coiled dough loaf is adapted to travel, and a kneader on the said working surface of said base member, said kneader having a pair of diverging ribs arranged in the form of a V centrally disposed between the sides of said base member with the apex adjacent the receiving end of said pressure board and having a surface between said ribs depressed with respect to the plane of the crests of said ribs, said depressed surface being convex in transverse cross section with said convex surface facing outwardly from said base member, and said ribs having sloping sides with the slope of the inner sides of the ribs being steeper than the slope of the outer sides of the ribs.

9. A pressure board for kneading a coiled dough loaf comprising a base member having an end adapted to receive a coiled dough loaf and having a working surface along which the coiled dough loaf is adapted to travel, and a kneader on the said working surface of said base member, said kneader having a pair of diverging ribs arranged in the form of a V centrally disposed between the sides of said base member with the apex adjacent the receiving end of said pressure board, said ribs at their divergent end terminating short of the end of said kneader, the surface of said kneader rearward of said ribs being convex in transverse cross section rising to an elevation approximately in the plane of the crests of said ribs, and the surface of said kneader between said ribs being depressed with respect to the plane of the crests of said ribs, said last named surface being convex in transverse cross section with said convex surface facing outwardly from said base member and sloping longitudinally to merge into said first named surface.

References Cited in the file of this patent

UNITED STATES PATENTS

| 1,536,224 | Lauterbur et al. | May 5, 1925 |
| 1,787,778 | Dell | Jan. 6, 1931 |
| 1,945,073 | Raith | Jan. 30, 1934 |
| 2,431,073 | Palmer | Nov. 18, 1947 |
| 2,431,074 | Palmer | Nov. 18, 1947 |
| 2,461,868 | Baird | Feb. 15, 1949 |

FOREIGN PATENTS

| 192,102 | Great Britain | Jan. 26, 1923 |
| 291,692 | Great Britain | June 7, 1928 |